March 30, 1965  H. L. OLSON  3,175,482
TIMER
Filed June 19, 1962  2 Sheets-Sheet 1
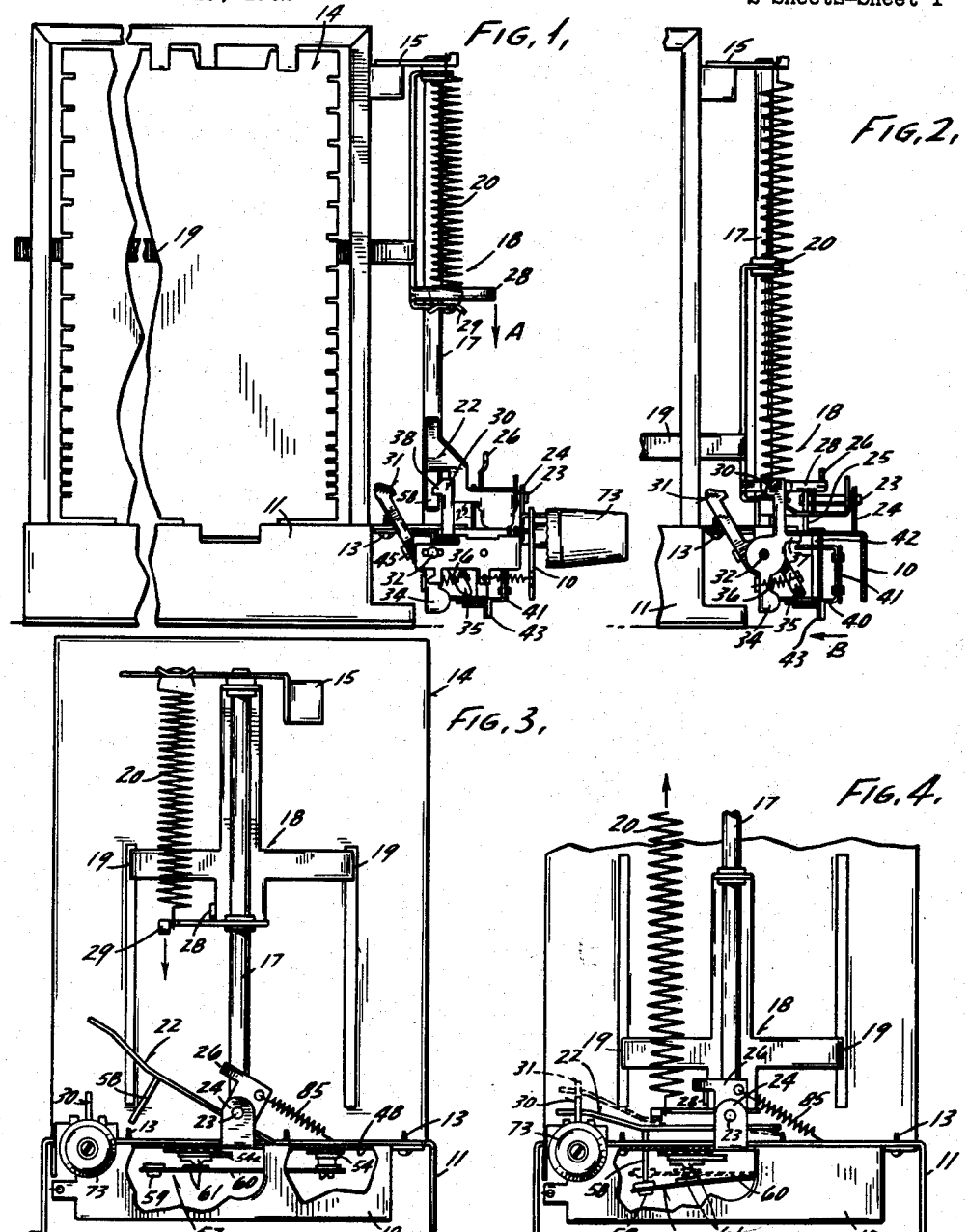
INVENTOR.
HENRY L. OLSON
BY 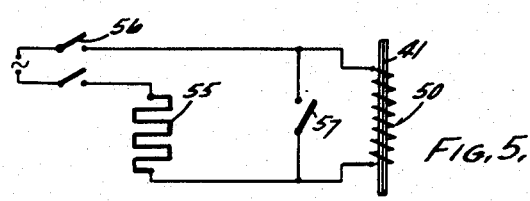
ATTORNEY.

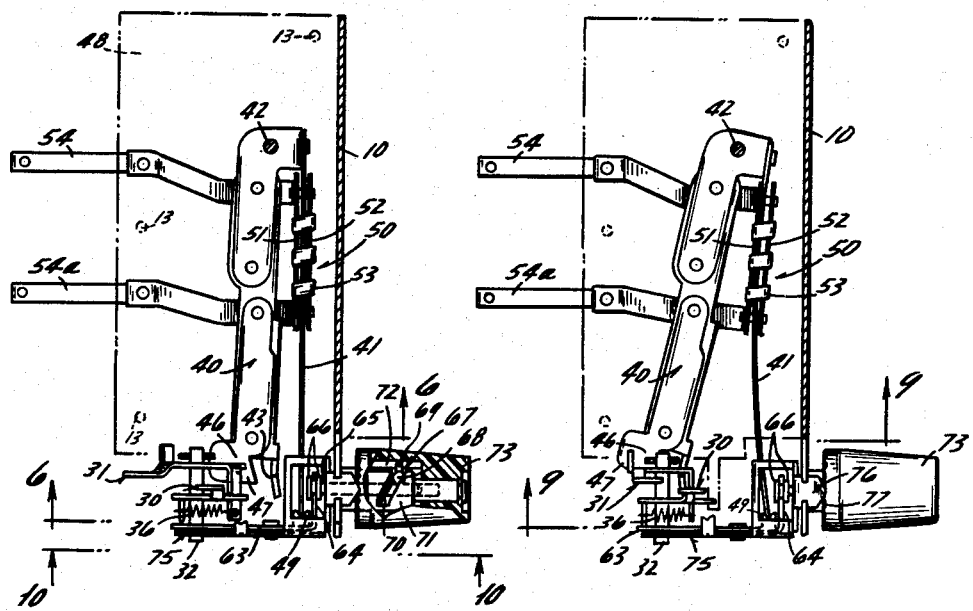

United States Patent Office 3,175,482
Patented Mar. 30, 1965

3,175,482
TIMER
Henry L. Olson, West Dundee, Ill., assignor to McGraw-Edison Company, Milwaukee, Wis., a corporation of Delaware
Filed June 19, 1962, Ser. No. 203,582
3 Claims. (Cl. 99—329)

This invention relates to automatic electric toasters and, more specifically, to an improved timing mechanism for such toasters.

To simplify the manufacture and improve the over-all quality of electric toasters, a distinct advantage would reside in producing the timer mechanism as a compact, unitary subassembly which need only be physically connected to the toaster frame at a minimum number of points and connected electrically. Such an assembly should incorporate the apparatus to provide for timing the cycle of operation, for adjustment of cycle duration, for securing the toast supporting carriage in a toasting position, for release of the carriage at the end of the cycle and means for manually releasing the carriage at any time during the cycle. By utilizing a unitary assembly, not only is the assembly of the toaster simplified, but also the timer assembly and the various component parts thereof may be checked and adjusted prior to incorporation into the unit rather than after the unit is assembled.

Applicant has provided such a unitary assembly, in the description of a preferred embodiment that follows, using a control lever actuated by motion of the carriage that retains the carriage and also actuates a switch. Retaining the control lever is an escapement formed of a pair of latch levers, the latter being controlled by a bimetal that moves an actuating arm upon being heated and cooled. The timing is effected by controlled heating of the bimetal using a heater actuated by the above mentioned switch. This entire mechanism is mounted on a single timer base plate or support member and may be thoroughly inspected and adjusted prior to its being connected to the toaster main frame by three self tapping screws and two electrical connections.

It is an object of this invention to provide a more compact and improved timer mechanism.

It is a further object of this invention to provide a timer in the form of a unitary assembly that may be incorporated into a completed toaster with a minimum number of mechanical and electrical connections.

It is also an object of this invention to provide a timer assembly that can be completely tested and adjusted prior to being incorporated into a toasting unit.

Other objects and advantages of the present invention will be apparent from the following description when taken in connection with the accompanying drawings wherein:

FIG. 1 is an interrupted partial side elevation of a toaster incorporating the timer of this invention;

FIG. 2 is a fragmentary side elevation of the toasting unit showing the carriage, control lever and escapement;

FIGS. 3 and 4 are partial end elevations showing the carriage in raised and lowered positions respectively;

FIG. 5 is a schematic diagram showing the wiring of the toaster heating elements;

FIGS. 6 and 7 are plan views of the timer partially broken away illustrating the bimetal at cooled and heated operating positions;

FIGS. 8 and 9 are elevation views of the escapement and control respectively corresponding to the operating conditions of FIGS. 6 and 7; and FIGS. 10 and 11 show the manual release of the escapement in non-actuated and actuated conditions respectively.

Referring to FIGS. 1 and 2 a timer support or base plate 10 is mounted on the toaster main frame 11 by three self tapping screws 13. Also mounted on the main frame 11 is an oven frame 14 to which is secured a bracket 15 with a rod 17 extending from the bracket 15 to the main frame. Journalled about the rod 17 is a carriage 18 having toast carrying arms 19 extending from the carriage through the toasting chambers of the oven. The carriage 18 has an upper loading position shown in FIG. 1 and a lowered toasting position as shown in FIG. 2 with a tension spring 20 interconnected between the carriage and bracket 15 to urge the carriage toward the uppermost or loading position.

A control lever 22 is pivotally mounted on the base plate 10 about a pivot pin 23 which is supported by the ears 24, 25 that are an integral portion of the support. Formed as an integral part of the control lever 22 is a latch 26 which is oriented to engage the cantilever arm 28 of the carriage 18 when the latter is in the lowered positions indicated in FIG. 4. The control lever 22 also underlies the carriage tab 29, FIG. 3, so that in the course of downward travel of the carriage, as indicated by the arrow A, the tab depresses the control lever from the attitude shown in FIG. 3 to that of FIG. 4.

A pair of latch levers 30 and 31 are pivotally mounted on the base plate 10 about the axis of the pin 32 with downwardly extending arms 34 and 35 respectively. A spring 36 interconnecting the latch levers 30 and 31 biases the upper latching portions toward one another. The lever 30 has a tab 37 that normally abuts the base plate 10 to position the lever in the control lever latching position shown in FIGS. 1 and 2 while presenting the angular camming surface 38 to allow displacement by the control lever 22 when the latter is pivoted to a latching position. A control arm 40 which is actuated by a bimetal strip 41 is pivotally mounted on the base plate 10 about the pin 42. To release the latch lever 30 from latching engagement with the control lever 22 the control arm portion 43 abuts the downwardly extending arm 34 and pivots the latch lever.

The latch lever 31 has a tab 45 that abuts the base plate 10 when the lever is permitted to pivot in a clockwise direction to prevent pivoting beyond a control lever latching position. The downwardly extending arm 35 of the lever 31 contacts a surface 46 of the control arm plate 47 which normally maintains the lever in a non-latching position with respect to the control lever 22. When the control arm 40 pivots the plate 47 in the direction of the arrow B the plate 47 moves out of contact with the arm 35, terminating the restraint and allowing the lever 31 to move to a control lever latching position.

FIGS. 6 and 7 show the bimetal strip 41 riveted at one end to the control arm 40 and restrained at the opposite end by the selectively positionable, bifurcated member 49. A heater 50 surrounds a portion of the bimetal strip and is formed of two sheets of mica 51, 52 on either side of the bimetal and about which is wound the heat generating, electrical resistance ribbon 53. The terminal ends of ribbon 53 are connected to bus bars 54 and 54a, which bus bars are secured to an electrically insulating plate 48 (FIG. 3) that is in turn riveted to base plate 10. Upon heating the bimetal 41 attains the curved condition shown in FIG. 7. FIG. 5 shows the electrical circuit to the toasting elements which are represented by the load 55. When the double pole line switch 56 is closed current passes in series through the bimetal heater 50 and the load 55. When the switch 57 is closed the current by-passes the heater 50 and passes only through the load 55 presented by the toasting elements. It is recognized that the heater 50 is still in the circuit in parallel with the switch 57 but the parallel path therethrough is of such high resistance that it can be considered that current through the heater is nil.

The switch 57, which can be seen in FIGS. 3 and 4, interconnects bus bars 54 and 54a. This switch is closed during all periods of operation except when the control lever is retained by the latch lever 30 as shown in the solid line portion of FIG. 4. In this condition the control lever tab 58 contacts the porcelain insulator 59 and depresses the copper switch arm 60 to separate the contacts 61.

The length of the timer cycle is controlled by the position of the bifurcated member 49 thereby determining the amount of distortion of the bimetal strip 41 required to actuate the latch levers 30 and 31. The member 49 is mounted on a bracket 63 that is supported for reciprocating motion on the base plate 10, as shown in FIG. 6. A turned end portion 64 of the bracket 63 is journalled about shaft 65 between the flanges 66 for reciprocating motion in unison with the shaft. Rigidly connected to shaft 65 is a cam follower 67 which has one portion 68 confined in the helical slot 70 of the stationary sleeve 71 and a second portion 69 that is confined by slot 72 which is formed in the knob 73 and is parallel to the axis of the knob. Accordingly, as the knob is rotated the cam follower is caused to pivot about the axis of the shaft 65 by restraint of the knob slot 72 and is caused to reciprocate the shaft 65 by the restraint of the camming surfaces of the slot 70 in the sleeve 71. Thus rotating knob 73 reciprocates the bifurcated member 49.

A manual release is provided that will, upon actuation, displace both latch levers away from a control lever engaging condition. The release bar 75, FIGS. 10 and 11, is mounted on base plate 10 for reciprocating motion parallel to the axis of knob 73. A turned tab 76, integral with the bar 75, contacts the end surface of knob 73. The knob is provided with a series of detents 77 to prevent accidental turning of the knob 73 when it is reciprocated to release the control lever. The release bar normally is in the position shown in FIG. 10. When the knob is pressed axially toward the base plate 10 as illustrated in FIG. 11 the depending arm 79 contacts the ear 80 to pivot the latch lever 30 away from a control lever latching position and simultaneously the inwardly extending arm 82 would contact the latch lever 31 to move it from a control lever latching position should the latch lever 31 be in the latching position shown in FIG. 9. When released, the knob is reciprocated away from base plate 10 and the release bar is returned to a non-actuated condition by the biasing action of tension spring 84.

In operation the cycle can be initiated either manually or by bread actuation of a motor to apply a downward force to the carriage 18 overcoming the biasing action of spring 20 and causing downward travel in the direction of the arrow A. The lower limit of carriage travel is reached as the tab 29 has depressed the control lever 22 to the point where the lower surface of the control lever abuts the upper surface of the base plate 10. When the downward force is terminated, the spring 20 urges the carriage upward and orients the various portions of the toasting unit as shown in the solid line portion of FIG. 4. In this condition the control lever 22 is retained by the latch lever 30 as shown in FIGS. 2, 6 and 8, and simultaneously, the control lever holds the carriage in the lowered position through engagement of the latch 26 with the cantilever arm 28 and the depending arm 58 has depressed the porcelain insulator 59 to separate the contacts 61.

In this position the line switch 56 is closed, being actuated by the downward travel of the carriage by a means not shown, and the switch 57 is open causing current to flow through both the bimetal heater 50 and the toasting elements 55.

As the bimetal strip 41 is thus heated and caused to distort, the control arm 40 is pivoted from the attitude shown in FIG. 6 to that in FIG. 7. As the control arm 40 pivots, the plate 47 moves out of restraining contact with the depending arm 35 permitting the biasing spring 36 to move the latch lever 31 into an upright control lever engaging attitude as shown in FIG. 9. Immediately thereafter the control arm portion 43 contacts the downwardly extending arm 34 and pivots the latch lever 30 out of latching engagement with the control lever 22 whereupon the biasing action of spring 85 pivots the control lever into engagement with latch lever 31. This condition is illustrated in FIGS. 7 and 9 and by the dotted portion of FIG. 4. In this condition the slight upward pivoting of the control lever 22 has allowed the switch 57 to close, but has not allowed the carriage 18 to be released from engagement with the latch 26. Accordingly, the line switch 56 remains closed, but the closing of switch 57 virtually, completely terminates current flow through the heater 50 allowing the bimetal strip 41 to cool and gradually return to the condition of FIG. 6.

As the control arm 40 pivots in the opposite direction to that of the heating cycle, the latch lever 30 is allowed to return to a control lever engaging condition, but the control lever 22 has now pivoted out of an engageable position and immediately thereafter the control arm plate 47 again contacts the downwardly extending arm 35 to pivot the latch lever 31 out of latching engagement with the control lever. The control lever 22, now being unrestrained, is pivoted by spring 85, releases the carriage 18 from engagement with latch 26 whereupon the spring 20 moves the carriage to the loading position, completing and terminating the cycle of operation.

Although but one embodiment has been shown and described, it will be apparent to those skilled in the art that various changes and modifications may be made therein without departing from the spirit of the invention or the scope of the appended claims.

I claim:

1. In a toaster having a main frame and a vertically movable toast supporting carriage with an upper loading position and a lower toasting position, a timer assembly comprising a support member releasably secured to said main frame; a control lever pivotally mounted on said support and having a carriage engaging latch member formed integrally therewith, said control lever disposed in the path of downward travel of said carriage whereby said control lever is pivoted to a carriage retaining latching position by said downward travel; first and second latch levers pivotally mounted on said support for retaining said control lever in first and second carriage retaining positions; an actuating arm pivotally connected to said support and pivotable in one direction to engage and pivot said first latch lever from a control lever retaining position and pivotable in the opposite of said one direction to pivot said second latch lever from a control lever retaining position; a bimetal strip connected at one end thereof to said actuating arm; selectively movable retaining means confining the end of said bimetal opposite said one end with respect to said support; heating means disposed in heat delivering relation to said bimetal; said heating means being energized when said control lever is in said first carriage retaining position to cause said actuating arm to pivot in said one direction and thereafter being de-energized when said control lever is in said second carriage retaining position to cause said actuating arm to pivot in the opposite of said one direction and a release bar and a color control bracket each carried by said support for linear reciprocating motion with respect thereto and for independent abutting sliding motion in a common direction with respect to one another, said release bar being movable in one direction to simultaneously pivot said first and second latch levers away from control lever retaining positions and biased in the opposite of said one direction, said color control bracket being reciprocable with respect to said support with said selectively movable retaining means carried thereby for movement in unison therewith.

2. The timer of claim 1 further comprising a shaft pivotally mounted on said support; a knob carried by said support for pivotable movement in unison with said shaft and axially reciprocable with respect to said shaft to engage and move said release bar in said one direction and means operatively interconnecting said shaft and said color control bracket for translating rotation of said knob into linear sliding motion of said color control bracket.

3. A toaster comprising a vertically movable carriage having an upper loading position and a lower toasting position, said carriage being biased toward said loading position; a support; a control lever pivotally mounted on said support having a latching portion releasably engageable with said carriage to retain said carriage in said toasting position, said control lever being biased toward a nonlatching position and pivotable to a latching position by downward movement of said carriage; first and second latch levers pivotally mounted on said support and biased toward a control lever retaining position, said first latch lever normally disposed in latching position to retain said control lever; an actuating arm pivotally mounted on said support; bimetal means secured at one end thereof to said actuating arm; heating means disposed in heat delivering relation to said bimetal means; selectively positionable retaining means confining the opposite end of said bimetal with respect to said support whereby when said heating means is energized said actuating arm pivots in one direction and upon cooling said bimetal said actuating arm pivots in the opposite of said one direction; normally closed switch means having a single pair of mutually confronting contact members mounted on said support and electrically connected in parallel with said heating means, said control lever urging said switch to an open condition to actuate said heating means when said control lever is retained by said first latch lever, said actuating arm normally restraining said second latch lever from attaining a control lever retaining position and upon elevation of said bimetal temperature terminating said restraint and pivoting said first latch lever out of latching position; a release bar and a color control bracket each carried by said support for horizontal reciprocating sliding motion with respect thereto and for horizontally abutting sliding motion with respect to one another, said release bar being movable in one direction to simultaneously pivot said first and second latch levers away from control lever retaining positions and biased in the opposite of said one direction, said retaining means being carried by said color control bracket and movable in unison therewith.

References Cited by the Examiner
UNITED STATES PATENTS

| | | | |
|---|---|---|---|
| 2,266,024 | 12/41 | Gomersall | 99—329 |
| 2,274,810 | 3/42 | Sardeson | 99—329 |
| 2,303,561 | 12/42 | Koci | 99—329 |
| 2,315,327 | 3/43 | Gomersall | 99—329 |
| 2,584,725 | 2/52 | McNairy | 99—329 X |
| 2,778,902 | 1/57 | Visos | 99—329 |

ROBERT E. PULFREY, *Primary Examiner.*

N. ANSHER, LAWRENCE CHARLES, *Examiners.*